UNITED STATES PATENT OFFICE.

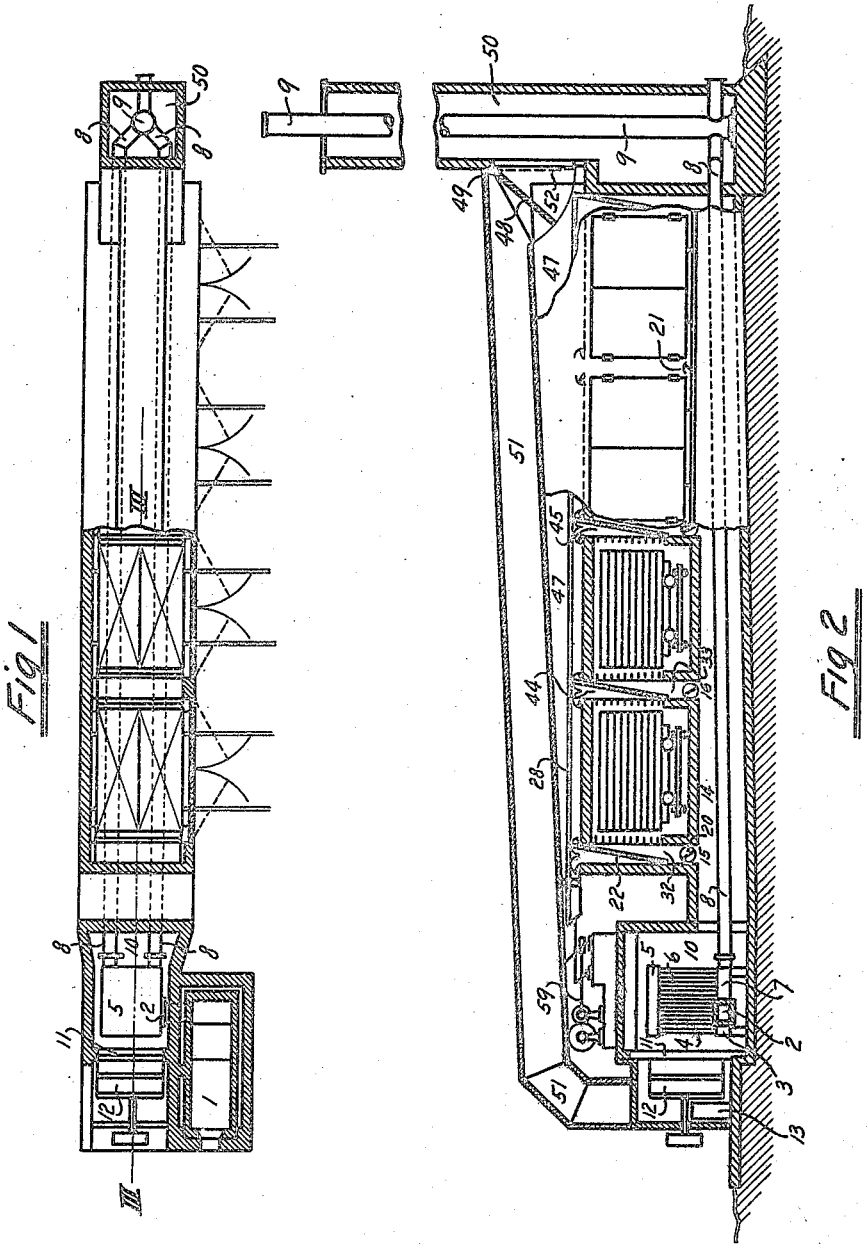

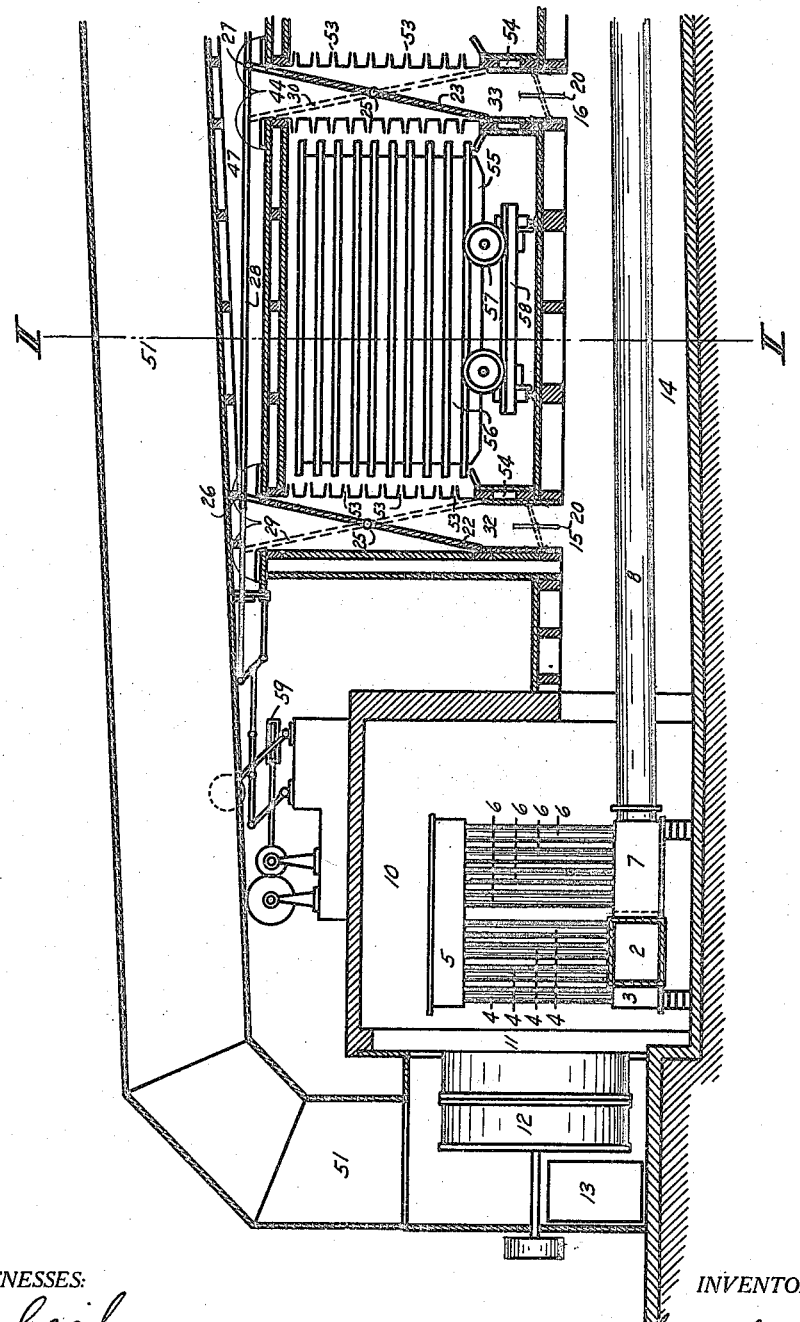

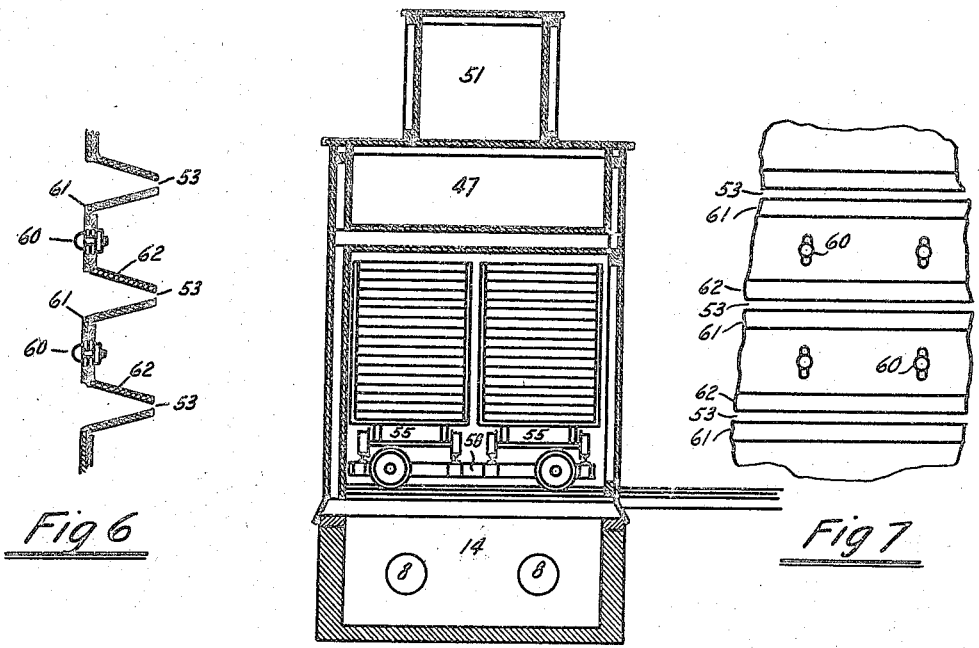
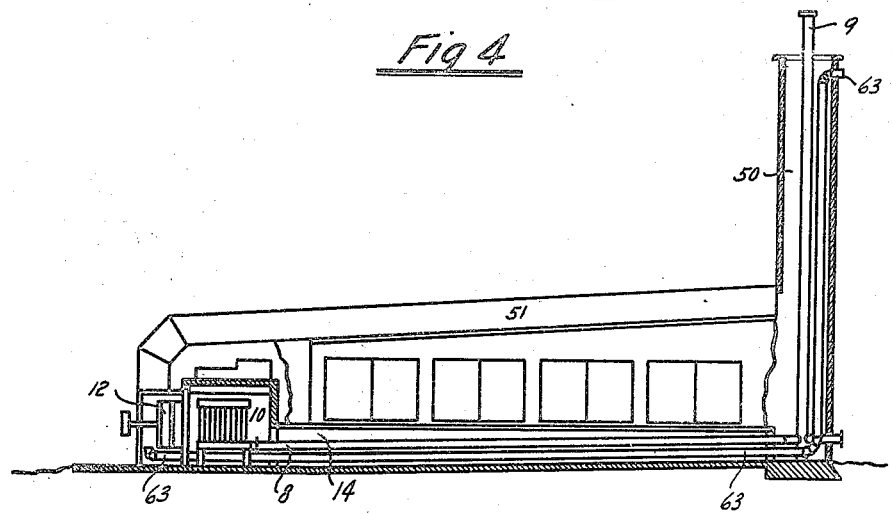

THOMAS I. CASEY, OF SAN FRANCISCO, CALIFORNIA.

DEHYDRATOR.

1,426,816.   Specification of Letters Patent.   Patented Aug. 22, 1922.

Application filed September 16, 1919. Serial No. 324,124.

*To all whom it may concern:*

Be it known that I, THOMAS I. CASEY, a resident of the city and county of San Francisco, State of California, have invented new and useful Improvements in Dehydrators, of which the following is a specification.

My invention has for its principal object the dehydration or removal of water content from vegetable or orchard products, or other food material to effect the better preservation, cheaper packing and transportation thereof. Other uses will be clear from the description which follows:

In dehydrators heretofore it has been found that the evaporation from portions of the exposed surfaces impregnate the air flowing from them so that as the air progresses further over other surfaces to be dried, it will not as readily absorb the moisture of the latter, with the result, that the rate of dehydration over the area of any given tray or surface is not constant resulting in some of the product being dried before other parts are dried to a greater or less degree. This inconvenience in dehydration makes necessary constant attention, great care, and the moving about of the parts of the material being dehydrated, or the removal of some of the material before the balance is completed. In my dehydrator I equalize the abstraction of the water content over the surfaces of the trays so that all parts on any one tray, and all the trays in a compartment, and all of the compartments of the dehydrator are, or may be, equally exposed so that the completion of dehydration of the charge will take place at the same time. Moreover I have provided adjustable means by which the treatment in any of the compartments may be varied from that being given to the others in case of a lack of homogeneity in the size or evaporative qualities of the different trays.

This I accomplish by distributing evenly within the trays the product to be dehydrated and placing these trays one upon the other with a circulation space, or in a suitable carrier frame, which is preferably made movable, and which in practice I prefer to mount upon wheels so that the entire frame with its charge of trays may be moved about as on tracks, and thus rolled into a dehydrating compartment. A plurality of these compartments are preferably to be arranged adjacent to each other, and when the door through which the trays have been entered, is closed, the compartment is subjected to hot air circulation. The direction of the air currents is alternated from time to time so that material throughout the entire tray receives substantially the same exposure to moisture-absorbing-air within the same period of time.

I also provide dampers so that a relatively greater or less quantity of moisture absorbing air may be directed over the trays of any one group or rack.

In the dehydrator of my present invention it is not necessary to fix partitions between the racks or trays in adjacent compartments as the swinging partitions serve the double purpose of directing the incoming air as well as the outgoing air.

It is to be noted that when the air advances over the top of the trays, containing for example fruit, the warm air striking the cold fruit will in most cases pick up the moisture from the fruit over which it first passes, a portion of which moisture will probably condense on the fruit at the latter end of the tray resulting in "sweating." This latter fruit would not then commence to give up its contained moisture; in other words, would not commence to dehydrate until some time after the fruit at the opposite end. We would thus have the product at one end completed considerably before the product at the latter end, unless the air current is periodically reversed, especially during the early stages of the dehydration.

I have found that if the hot air is passed over various fruit products immediately after it has been heated that it has a toughening effect upon the surfaces of the fruit or other material as compared with the same air at the same temperature when a period of time elapses between its acquiring heat and its contact with the material to be dehydrated.

My dehydrator is arranged to give this time interval and in the specific device shown in the illustration this is accomplished by arranging the air heating means remotely from the treatment chambers, the air thus having a period of time in its passage to the trays during which it acquires qualities that enable it to dry the material without toughening the surface.

The time period during which the warmed air is traversing these ducts results in what I have called "seasoning" the air, and the air so seasoned gives much better results in the treatment of some products than where it is insufficiently or not at all seasoned, this seasoning of the heated air results in softening the otherwise burning effect of the air in its action on the fruit surface.

I also arranged the passage ways from the air heating means to the trays so that the velocity of the air is approximately constant at all points of the cross section.

The rate of moisture abstraction is one that cannot be forced without deleterious influence on some products, and I provide means also whereby the entire body of air after passing over the trays may be again returned and again passed over the same trays, or so that any percentage of the used air may be returned and enter in with the circulating fresh air. By this means the greatest economy in heat and the best condition of product is attained, the rate of dehydration being under the control of the operator at all times, and thus the conditions are met to secure the best quality of finished product without the loss of heat, and therefore fuel, and with a minimum of expenditure of time. By referring to the drawings my invention will be made clear.

Fig. 1. is a plan view of my dehydrator showing four compartments, each for receiving a tier of trays, partly in section.

Fig. 2. is a side elevation also partly in section.

Fig. 3. is a section of the line III—III of Figure 1, showing one of the chambers and a rack of trays and a portion of the heating system in detail in elevation.

Fig. 4. is a section of Figure 3 on the line II, II of Figure 3.

Fig. 5. is the side elevation of the complete dehydrator with parts of the heating chamber and stack removed to better illustrate the arrangement. This also shows a special air inlet duct, being a variation in construction from the other figures.

Fig. 6. is a detail of the structure of the nozzles 53, showing the manner in which they are assembled and adjusted.

Fig. 7. is a side view of Figure 6.

Throughout the figures the same numerals refer to similar parts.

Numeral 1 indicates a furnace, or other heat producing source, from which the heat is conveyed through the duct 2 to the heater box 3, whose pipes 4, 4, 4, 4, connect into the header 5; from the header it passes through the pipes 6, 6, 6, 6 into the drum 7, from which it passes through the pipes 8, 8, and thence through suitable connections to the stack 9. The pipes 8, 8, pass through the hot air supply duct 14, so as to give up any heat still retained with the gases traveling through the pipes 8, 8, to the air flowing in the duct 14.

The duct 14 connects through the passages 10 and 11 with the delivery side of the fan 12 adapted to receive air through the opening 13, which may be provided with any well known form of damper, not shown.

The operation of the fan 12 is for the purpose of driving the air around the heater parts 4, 4, 4, 4, 5, 6, 6, 6, 6, 7, 8, 8, and thence through the air spaces in and around the trays carrying the material to be dehydrated.

An entry passage for each of the compartments is provided as at 15, 16, and the inflow to each compartment is preferably to be regulated by an externally adjustable damper, as 20, which may be set by the operator as with a quadrant and lever 21.

Within the hot air space at the end of the compartment I mount a swinging door, or partition, as 22, 23, pivoted as at 25. One end of said partitions is to be pivoted as at 26 and 27 to the connecting rod 28, adapted to reciprocate the partitions about the pivots 25 into their dotted positions 29, 30. The incoming hot air passes through the compartments as 32, 33, and thence through nozzles or apertures 53 and through the spaces between the trays thus contacting with the material to be dehydrated; thence out as at 44, 45, into the discharge duct 47. From duct 47 it passes up through the exhaust stack 50, or is caused to return, or a portion of it to return, through recirculation flue 51. This latter is accomplished through the action of the diverter 48, which is hinged at 49, and is to be operated externally into any adjusted position by any well known means, (not shown,) so that any portion of the circulating air from 47, not sufficiently impregnated with moisture, may be returned through the recirculation duct 51, and thence back through the fan 12, chamber 10, duct 14; and thence around the material to be dehydrated, as before. If the diverter 48 is swung down into the position 52, the entire air volume will be recirculated without taking any fresh air at 13. If the diverter be in a position as shown at 48, only a portion of said air will be recirculated, and the amount of fresh air taken in at 13 will be proportional to the amount of air permitted to pass into the exhaust stack 50.

At 59 I have shown mechanism for automatically reciprocating the partitions as 22, 23, through the agency of the connecting rod 28, and at 53, 53, 53, 53 I have shown apertures, or nozzles through which circulating air is directed into the passages between the trays. I prefer to arrange these nozzles in the ends of the compartments, so that when the trays are placed in the said compartments or in their carrier frame 55, spaces between the trays register with the said apertures of the nozzles. It is to be understood that the trays are preferably stacked on the carrier frame 55, with spaces between them as 56, through which the dehydrating air is to circulate. The carrier frame may be mounted upon wheels as 57 and the frames stacked in the fruit house ready to charge the compartment, and thence wheeled directly into said compartment, or first onto the transfer cars as 58, and then into the dehydrator.

In Figs. 6 and 7 are shown a preferable form of air nozzle. The width of the nozzle openings 53 may be varied by loosening the screws 60, 60 and sliding the nozzle plates 62, closing or opening the said spaces 53 and then reclamping the screws 60, 60.

Fig. 5 shows an apparatus for heating the incoming air through the inlet pipe 63, which passing through the heat duct 14 will be initially warmed before entering the chamber 10 and is sometimes advisable where great temperature and humidity variations are met with.

In practice it is advisable to introduce the necessary instruments for indicating at all times the condition of the air such as thermometers, hydrometers, etc., in the several air ducts so that the operator may intelligently adjust the degree of air feeding and circulation.

I claim:

1. In apparatus for the dehydration of food products, a plurality of compartments each adapted to receive a plurality of stacked trays, spaced apart; having ports or openings in the opposite walls of the compartments registering with said spaces, said adjacent compartment walls spaced apart forming air passages therebetween; pivoted partition members within said passages, adapted to contact their opposite edges with adjacent walls forming an inlet and an outlet passage of tapering section with the adjacent compartment walls respectively, and when swung about their pivots to form outlet and inlet passages respectively, as and for the purpose set forth.

2. In apparatus for the dehydration of food products, a plurality of compartments each adapted to receive a plurality of stacked trays, spaced apart; having ports or openings in the opposite walls of the compartments registering with said spaces, said adjacent compartment walls spaced apart forming air passages there-between; pivoted partition members within said passages, adapted to contact their opposite edges with adjacent walls forming an inlet and an outlet passage of tapering section, and when swung about their pivots to form outlet and inlet passages respectively, and independently adjustable dampers to control the air flow to said passages, as and for the purposes set forth.

3. In apparatus for the dehydration of food products a plurality of compartments each adapted to receive a plurality of stacked trays, spaced apart; having ports or openings in the opposite walls of the compartments registering with said spaces, said adjacent compartment walls spaced apart forming air passages there-between; pivoted partition members within said passages, adapted to contact their opposite edges with adjacent walls forming an inlet and an outlet passage of tapering section for the adjacent compartment walls respectively, and when swung about their pivots to form outlet and inlet passages respectively, and independently adjustable dampers to control the air flow to said passages, in combination with an air supply duct receiving heated and seasoned air from a distant source, said ducts having a varying cross section such that the air velocity will be substantially the same, as and for the purpose set forth.

4. In a dehydrator a plurality of trays, on which the material to be dehydrated is distributed, a carrier frame for groups of said trays having means for separating the said trays in spaced relation, inlet nozzles adapted to register with such spaces; means by which the aperture of the nozzle may be independently adjusted, the nozzles are on one side of said trays adapted to discharge, and the nozzles on the opposite side to admit air, to circulate through the said spaces, and means whereby the direction of air flow through the nozzles and over the trays may be reversed.

5. In a dehydrator a plurality of trays on which the material to be dehydrated is distributed, a carrier frame for groups of said trays having means for separating the said trays in spaced relation, inlet nozzles adapted to register with such spaces; means by which the aperture of the nozzles may be independently adjusted, the nozzles are on one side of said trays adapted to discharge, and the nozzles on the opposite side to admit air, to circulate through the said spaces, and means whereby the direction of air flow through the nozzles and over the trays may be reversed, in combination with a recirculation passage constructed and adapted to receive a portion of the air from the discharge nozzles and return the said air for further use through the inlet nozzles.

6. Apparatus as set forth in claim 1 in combination with a recirculation passage constructed and adapted to receive a portion of the air from the ports in one of the walls of the compartment and to return the said air for further use through the ports or openings in the opposite wall.

7. Apparatus as set forth in claim 2 in combination with a recirculation passage constructed and adapted to receive a portion of the air from the ports in one of the walls of the compartment and to return the said air for further use through the ports or openings in the opposite wall.

8. Apparatus as set forth in claim 3 in combination with a recirculation passage constructed and adapted to receive a portion of the air from the ports in one of the walls of the compartment and to return the said air for further use through the ports or openings in the opposite wall.

In testimony whereof, I have hereunto set my hand at the city of San Francisco, California, this 10th day of September, 1919.

THOMAS I. CASEY.

In presence of—
P. S. PIDWELL.